US011620337B2

United States Patent
Ashall et al.

(10) Patent No.: US 11,620,337 B2
(45) Date of Patent: Apr. 4, 2023

(54) IDENTIFYING AND CONTEXTUALIZING INDIVIDUALS IN AN ORGANIZATION

(71) Applicant: Microsoft Technology Licensing, LLC., Redmond, WA (US)

(72) Inventors: Stefan Alexander Ashall, Oslo (NO); Vincent Olislangers, Oslo (NO); Rezaul Hoque, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 1183 days.

(21) Appl. No.: 14/788,351

(22) Filed: Jun. 30, 2015

(65) Prior Publication Data
US 2017/0004181 A1   Jan. 5, 2017

(51) Int. Cl.
*G06F 16/901* (2019.01)

(52) U.S. Cl.
CPC .............. *G06F 16/9024* (2019.01)

(58) Field of Classification Search
CPC ............. G06Q 10/06; G06F 17/30958; G06F 16/9024; G06F 16/24575; G06F 3/04842; G06F 16/248
USPC .......................... 707/722, 736, 769, 797, 798
See application file for complete search history.

(56) References Cited

U.S. PATENT DOCUMENTS

| | | | |
|---|---|---|---|
| 5,842,009 A | 11/1998 | Borovoy et al. | |
| 7,274,375 B1 * | 9/2007 | David | G06Q 10/06 715/764 |
| 7,679,518 B1 | 3/2010 | Pabla et al. | |
| 8,243,897 B2 | 8/2012 | Groth | |
| 8,332,782 B1 * | 12/2012 | Chang | H04L 12/6418 707/794 |
| 8,346,590 B2 | 1/2013 | Norton et al. | |
| 8,489,442 B1 | 7/2013 | Mohler | |
| 8,904,295 B2 | 12/2014 | Whalin et al. | |
| 9,141,958 B2 * | 9/2015 | Iyer | H04L 41/5061 |
| 10,146,875 B2 * | 12/2018 | Bhatia | G06F 16/9535 |
| 2010/0235212 A1 | 9/2010 | Godfrey et al. | |
| 2011/0184772 A1 | 7/2011 | Norton et al. | |
| 2012/0246574 A1 | 9/2012 | Hoard et al. | |
| 2012/0311460 A1 | 12/2012 | Boyd | |
| 2013/0091149 A1 * | 4/2013 | Dunn | G06Q 10/10 707/749 |

(Continued)

OTHER PUBLICATIONS

"Stay in the know with Office Delve", Published on: Jan. 5, 2015 Available at: https://products.office.com/en-us/business/explore-office-delve.

(Continued)

*Primary Examiner* — Phong H Nguyen
(74) *Attorney, Agent, or Firm* — Holzer Patel Drennan

(57) ABSTRACT

An identification and contextualization system comprising a contextualizing engine is provided. The contextualizing engine comprises various components that are operable to analyze an information item related to a user for identifying one or more individuals associated with the information item, and interrogate a graph structure for determining whether each of the one or more individuals associated with the information item is someone whom the user has met or has worked with based on edges and weights stored in the graph structure. When an individual who is associated with the information item is identified, the contextualizing engine is further operable to discover contextual information associated with the individual, and generate an information element surfacing the contextual information associated with the individual for display to the user.

20 Claims, 10 Drawing Sheets

(56) References Cited

U.S. PATENT DOCUMENTS

| | | |
|---|---|---|
| 2013/0246116 A1 | 9/2013 | Bank et al. |
| 2013/0290434 A1 | 10/2013 | Bank et al. |
| 2014/0089466 A1* | 3/2014 | Iyer ............... H04L 41/5061 709/219 |
| 2014/0101247 A1* | 4/2014 | Pappas .............. H04L 67/22 709/204 |
| 2014/0108383 A1* | 4/2014 | Chan ............. G06F 17/30699 707/722 |
| 2014/0136612 A1 | 5/2014 | Redfern et al. |
| 2014/0189530 A1* | 7/2014 | Anand ............. H04L 65/403 715/753 |
| 2014/0278670 A1 | 9/2014 | Mermelstein |
| 2014/0280582 A1 | 9/2014 | Aylesworth et al. |
| 2015/0100356 A1* | 4/2015 | Bessler ............. G06Q 30/01 705/7.12 |
| 2015/0249742 A1* | 9/2015 | Li .................... H04W 68/04 455/414.1 |
| 2015/0256635 A1* | 9/2015 | Casey ............... H04L 43/12 709/224 |
| 2015/0350372 A1* | 12/2015 | Griffin .............. H04L 43/045 348/14.07 |
| 2015/0379445 A1* | 12/2015 | Wang ........... G06Q 10/06311 705/7.13 |
| 2016/0065630 A1* | 3/2016 | Gupta ............... G06Q 10/10 709/204 |
| 2016/0094963 A1* | 3/2016 | Gupta ............ G06Q 10/1095 705/7.19 |
| 2016/0179965 A1* | 6/2016 | Bhatia ............ G06F 16/9535 707/749 |
| 2016/0203510 A1* | 7/2016 | Pregueiro .......... G06Q 10/06 705/14.45 |
| 2016/0321760 A1* | 11/2016 | Hu .................. G06Q 10/063 |
| 2016/0358214 A1* | 12/2016 | Shalunov ........ G06Q 30/0639 |

* cited by examiner

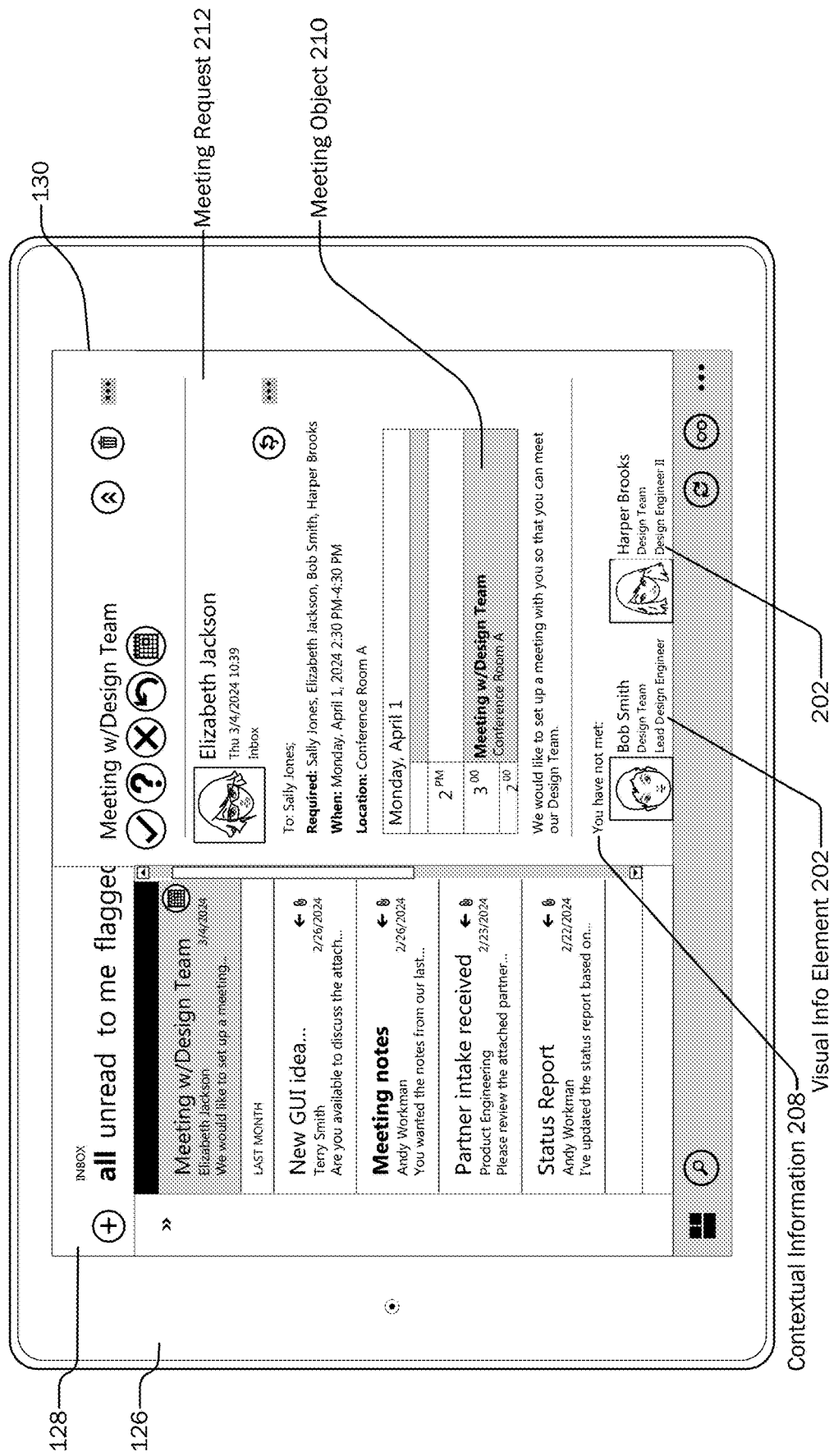

IDENTIFYING AND CONTEXTUALIZING INDIVIDUALS IN AN ORGANIZATION

BACKGROUND

Many users in organizations use an electronic calendaring system to organize calendar events, such as meetings. Typically, electronic calendaring systems store and provide information about a scheduled meeting, such as date and time information, potential attendees, recurrence properties, and a textual description of the meeting. There are times when users have scheduled meetings with people whom they have never met. Sometimes, users may not be sure whether they have met a person before or worked with the person in the past. Other times, users may be aware that they have not met or worked with a person, and may want to know information about the person, such as the person's background, experience, job title, documents the person has worked on, the person's colleagues, etc.

In an enterprise situation, for example, a company, school, social network, etc., a given user may encounter hundreds (or more) of documents or other information items, each with varying degrees of relevance, interest, or importance to the information worker, and that are oftentimes scattered across a variety of workloads and storage systems (e.g., email accounts, calendars, social feeds, intranet sites, network file systems, etc.). Accordingly, it can be time consuming and inefficient for users to search for content that is relevant to them. Additionally, users are oftentimes unaware of relevant or interesting information items that are available to them, for example, content that is associated with people whom users have not met or have not met or worked with recently.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter. Aspects are directed to an automated system and method for identifying an individual associated with an information item whom a user has not met or worked with, whom the user has worked with distantly, or whom the user has not worked with recently, and providing contextual information to the user about the individual.

An identification and contextualization system comprises an analysis processing engine communicatively attached to various data repositories or workloads from which it collects signals of activities between people and between people and enterprise data, establishes edges in a graph structure representative of relationships between the people and between the people and the enterprise data according to the activities, and calculates weights associated with the relationships (edges).

The identification and contextualization system further comprises a contextualizing engine communicatively attached to the graph structure, to various data repositories or workloads, and to one or more client applications. In some examples, the contextualizing engine queries a workload, for example, a user's electronic calendar, for one or more information items, such as meeting objects (e.g., upcoming meetings), analyzes the one or more information items for individuals associated with the items (e.g., meeting attendees), and interrogates the graph structure for determining whether each of the individuals associated with the one or more information items is a person with whom the user is or is not acquainted based on the relationship data stored in the graph structure. In some examples, upon identification of a person associated with an information item with whom the user is not acquainted (e.g., a person with whom the user has not met or worked with, whom the user does not have a close working relationship with, or whom the user has not worked with recently), the contextualizing engine interrogates the graph structure for relevant information associated with the person, and generates an element for display to the user, wherein the element exposes the relevant information or provides a link to the relevant information which the user may access.

Aspects of the identification and contextualization system and method automatically expose relevant information to a user about people who are unfamiliar to the user and with whom the user may have an interaction. Aspects identify information trending around people, content people have in common with others, and social connections that traverse organizational boundaries. Aspects put the relevant information in context and present the relevant information to the user in a way that allows the user to use the information to work smarter. For example, automatically exposing relevant information to the user helps to increase the user's efficiency and productivity by enabling the user to spend less time searching for information associated with an unfamiliar person or people. Additionally, aspects may surface information to the user of which the user may not be aware, thus fostering sharing of knowledge and collaboration across the organization.

Examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2A-D are illustrations showing examples of surfacing contextual information associated with an individual to a user;

DETAILED DESCRIPTION

Figure 1:
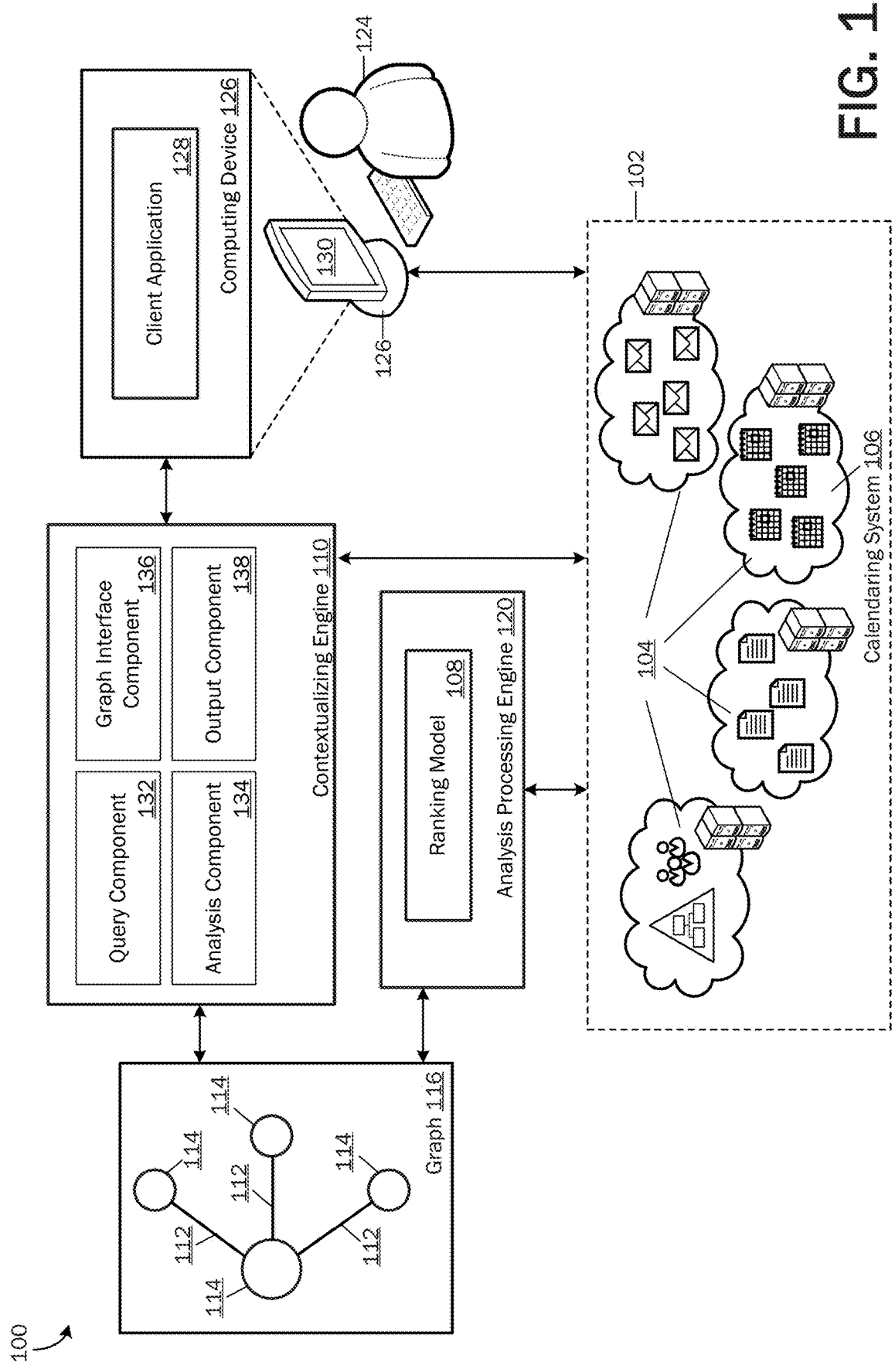
FIG. 1 is a simplified block diagram of a system for identifying and contextualizing individuals in an organization.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to identifying and contextualizing individuals in an organization. FIG. 1 is a simplified block diagram of one example of an identification and contextualization system 100. As illustrated in FIG. 1, an analysis processing engine 120 analyzes and collects a variety of signals of activities from across various workloads 102. For example, as users work on information items 104 and interact with their peers and colleagues, activity signals are generated, are collected by the analysis processing engine 120, and are stored in a graph structure 116 as a network of nodes 114 and edges 112. According to examples, the various activity signals that are stored in the graph structure 116 enable a user 124 to be connected to various people in an enterprise (via person-person activity signals) and to various information items 104 (via person-document activity signals). In the graph structure 116, people and information items 104 are stored as nodes 114 and are connected to other nodes by edges 112 representative of the activities between people and activities on information items 104 by people in the organization. A user's relationship with another person or with an information item 104 is defined by the activity signals connecting the user to the person or to the information item 104.

According to aspects, edges 112 include edge properties that include details about the activity, the date of the activity, and a weight assigned by a ranking model 108. The ranking model 108 calculates and assigns weights to edges 112 based on various factors, such as the type of activity (e.g., sending/receiving an email to/from a person, sending/receiving an instant message to/from a person, attending a meeting with a person, producing an information item, viewing an information item, sharing an information item, liking an information item, commenting on an information item, modifying an information item, etc.), a frequency of activity, an age decay factor, a type of organizational relationship between people (e.g., colleague, peer, manages, directs, etc.), etc.

The workloads 102 include various data repositories, which may include remote servers, local or remote databases, local or remote shared resources repositories, social networking service servers, emailing system servicer, calendaring system servers 106, and the like. The workloads 102 store various types of information items 104, such as documents, images, data files, video files, audio files, meeting items, communication items, such as electronic mail items, text messages, telephone messages, posts, blogs, and the like.

Referring still to FIG. 1, the identification and contextualization system 100 comprises a contextualizing engine 110 that is operable to analyze an information item 104 related to a user 124 for identifying one or more individuals associated with the information item 104, and interrogate the graph structure 116 for determining whether each of the one or more individuals associated with the information item 104 is someone whom the user 124 has met or has worked with based on the edges 112 and weights stored in the graph structure 116. According to examples, the contextualizing engine 110 comprises various components, such as a query component 132, an analysis component 134, a graph interface component 136, and an output component 138. According to an aspect, the various components of the contextualizing engine 110 operate over distributed systems (e.g., cloud-based computing systems), where application functionality, memory, data storage and retrieval and various processing functions are operated remotely from each other over a distributed computing network, such as the Internet or an intranet. According to another aspect, the various components of the contextualizing engine 110 are deployed on a single computer.

According to examples, the analysis component 134 is operable to analyze an information item 104 for identifying one or more individuals associated with the information item 104. For example, if the information item 104 is a meeting object, such as a meeting request for a meeting of which the user 124 is a potential attendee or a scheduled meeting on the user's calendar, the analysis component 134 is operable to analyze the meeting object for identifying one or more potential meeting attendees. In some examples, the analysis component 134 is further operable to filter certain information items 104, for example, with meeting objects, "all-hands" meetings that include a large number of attendees may be filtered out.

As another example, if the information item 104 is a document on which the user 124 is acting, for example, viewing the document, modifying the document, commenting on the document, etc., the analysis component 134 is operable to analyze property information associated with the document for identifying an author or producer of the document.

As another example, if the information item 104 is an email or other communication item that the user 124 is a recipient of or an email or other communication item that the user 124 is drafting, the analysis component 134 is operable to analyze the communication item for identifying one or more recipients or a sender of the communication item.

According to examples, the graph interface component 136 of the contextualizing engine 110 is operable to interrogate the graph structure 116 for determining whether each of the one or more individuals associated with the information item 104 is someone whom the user 124 has met or has worked with in the past based on edges 112 and weights stored in the graph structure 116. According to an aspect, the graph interface component 136 uses a graph application programming interface (API) to interrogate the graph structure 116. In some examples, the graph interface component 136 may query the graph structure 116 via the graph API for individuals associated with the information item 104 who are not connected to the user 124 by an edge 112. Accordingly, these individuals are determined to be people whom the user 124 has likely not worked with or met.

In other examples, the graph interface component 136 may query the graph structure 116 via the graph API for individuals associated with the information item 104 who are connected to the user 124 via an edge with a weight below a certain threshold. For example, the graph interface component 136 may query for edges 112 below a certain weight for identifying individuals associated with the information item 104 who have a distant working relationship with the user 124.

In other examples, the graph interface component 136 may query the graph structure 116 via the graph API for individuals associated with the information item 104 who are connected to the user 124 via older edges 112. For example, the graph interface component 136 may query for edges with a timestamp older than a certain date for identifying individuals associated with the information item 104 with whom the user 124 has not met or worked with recently.

In some examples, the query component 132 of the contextualizing engine 110 is operable to query a database or a workload 102 for information items 104, such as an electronic calendar associated with the calendaring system 106, an email server, etc. According to an aspect, the query component 132 queries a workload 102 on a recurring predetermined time interval. For example, the query component 132 may query a user's electronic calendar once a week at the beginning of the week for identifying contexts of potential meeting attendees of meetings that the user 124 is scheduled to attend in the upcoming week.

In some examples, upon identification of a person associated with an information item 104 whom the user 124 has not met or worked with, whom the user 124 has worked with distantly, or whom the user 124 has not worked with recently, the graph interface component 136 is further operable to interrogate the graph structure 116 for discovering information about the person and/or relevant information items 104 associated with the person. For example, the graph interface component 136 may query the graph structure 116 for documents the person has produced or authored, colleagues of the person, or other information, such as the person's job title, department, experience, background, etc.

As illustrated in FIG. 1, the contextualizing engine 110 comprises an output component 138 operable to generate a visual information element for display to the user 124. According to an example, the visual information element exposes the information about the person or relevant information items 104 discovered by the graph interface component 136. According to another example, the visual information element provides a link to the information about the person or relevant information items 104 which the user 124 is enabled to access.

According to an aspect, the visual information element for display to the user 124 is surfaced to the user 124 via a client application 128 executing on a computing device 126. The computing device 126 illustrated in FIG. 1 is a desktop-style computing device; however, as should be appreciated, the client application 128 may execute on any suitable computing device, such as a desktop computer, laptop computer, tablet computer, handheld computing device, mobile communication device, wearable device, gaming device, and the like. The computing device 126 is configured to surface the visual information element on a display surface 130 of the computing device 126. According to aspects, the client application 128 may include various types of applications operable to receive the visual information element for display to the user 124. For example, the client application 128 may be an electronic mail application, a calendaring application, a word processing application, a spreadsheet application, a slide presentation application, an information discovery application, etc. As should be appreciated, examples are not limited to these example client applications 128 types. Examples of visual information elements for display to the user 124 generated by the contextualizing engine 110 are illustrated in FIGS. 2A-2D and are described below.

Figure 2A:
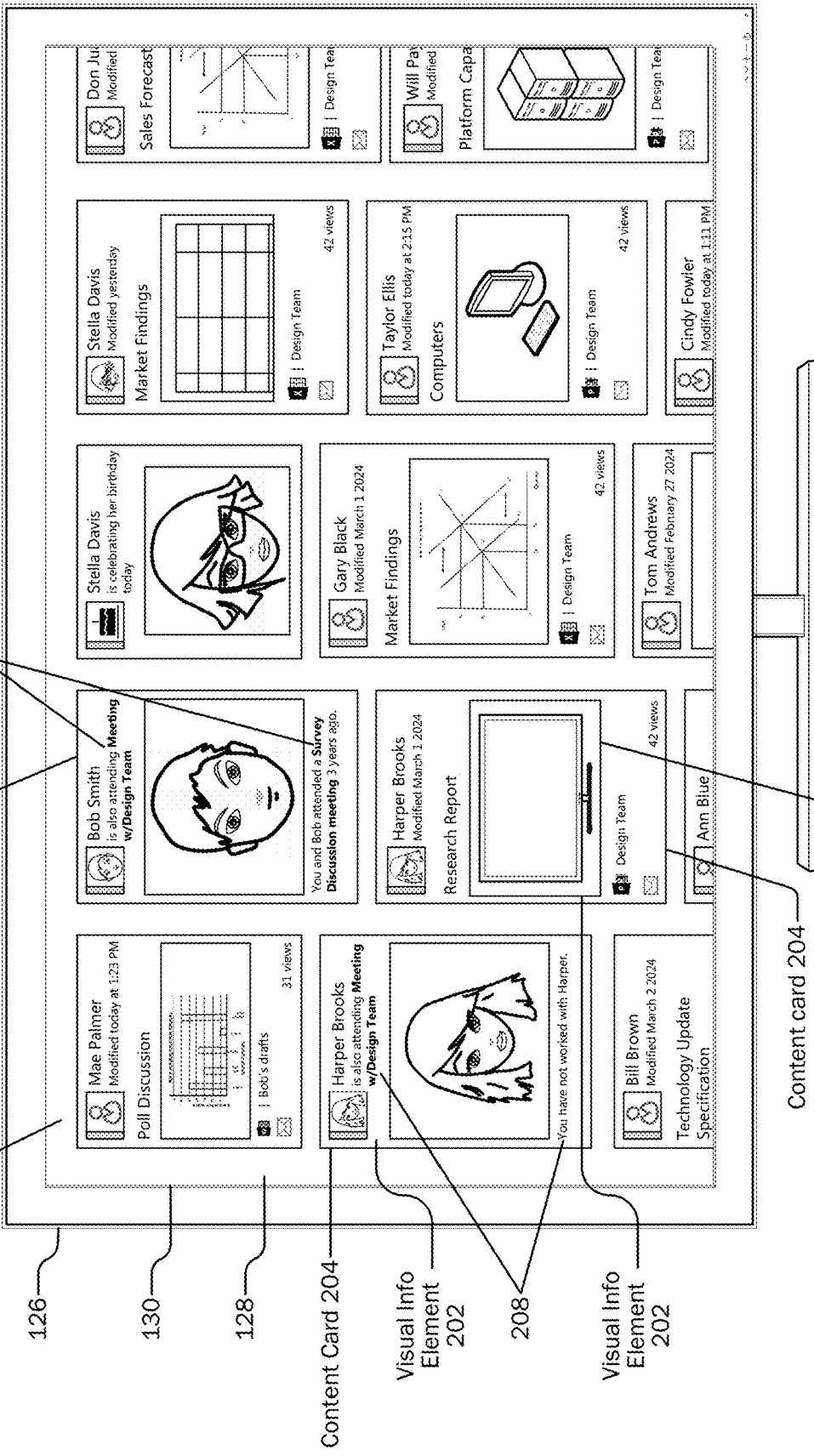

With reference now to FIG. 2A, in some examples, a visual information element 202 is in the form of a content card 204 surfaced to the user 124 in a content feed 206 via an information discovery client application 128. According to an aspect, the discovery client application 128 uses machine learning to proactively highlight information that is determined to be relevant to the user 124 based on what the user 124 is working on and colleagues with whom the user 124 works closely. The discovery client application 128 is operable to generate and populate a content feed 206 with a plurality of content cards 204, which are graphical representations of information items 104 that are determined to be of interest or relevance to the user 124. According to an example, in response to identifying an individual associated with an information item 104 whom the user 124 has not met or worked with, whom the user 124 has worked with distantly, or whom the user 124 has not worked with recently, the output component 138 generates a visual information element 202 associated with the individual and contextual information about the individual, and provides the visual information element 202 to the discovery client application 128 for inclusion in the content feed 206 in the format of a content card 204.

The content card 204 may include various pieces of information, such as the name of the individual, a job title and department, a picture or avatar of the individual, and contextual information 208 to help the user 124 to understand why the individual would be interesting or relevant to the user 124. For example, the content card 204 may include contextual information 208 such as that the individual is scheduled to attend a meeting that the user 124 is scheduled to attend. If the user 124 has not worked with the individual before, the contextual information 208 may include information informing the user 124 that he/she has not worked with the individual. If it has been a long time since the user 124 has worked with the individual, the contextual information 208 may include information informing the user 124 of the length of time since the user 124 last worked with the individual and the activity shared by the user 124 and the individual. Various elements of the content card 204 may be selectable. For example, selection of the individual's name, picture, or avatar may provide access to the individual's page, which may include a display of documents they the individual is working on and the individual's profile. As another example, selection of the contextual information 208 may provide access to additional information associated with the contextual information 208, such as meeting notes, presentation documents, emails, posts, etc.

In some examples, the client application 128 includes content cards 204 for information items 104 associated with the individual in the user's content feed 206, which may provide contextual information 208 to the user 124. Selection of the content card 204 may provide access to the information item 104.

With reference now to FIG. 2B, in some examples, an electronic communication client application 128 or a calendaring client application 128 provides a visual information element 202 for display to the user 124 in a communication item, such as an email, or in association with a meeting object 210, such as in a meeting request 212. According to an example and as illustrated in FIG. 2B, in response to identifying meeting attendees of an upcoming meeting (meeting object 210) whom the user 124 has not met or worked with, whom the user 124 has worked with distantly, or whom the user 124 has not worked with recently, the output component 138 generates visual information elements 202 associated with the individuals and contextual information about the individuals, and provides the visual information elements 202 to the calendaring client application 128 for inclusion in a meeting request 212. The visual information elements 202 may be selectable. For example, selection of a visual information element 202 may provide access to the individual's page, which may include a display of documents that the individual is working on and the individual's profile.

Figure 2C:
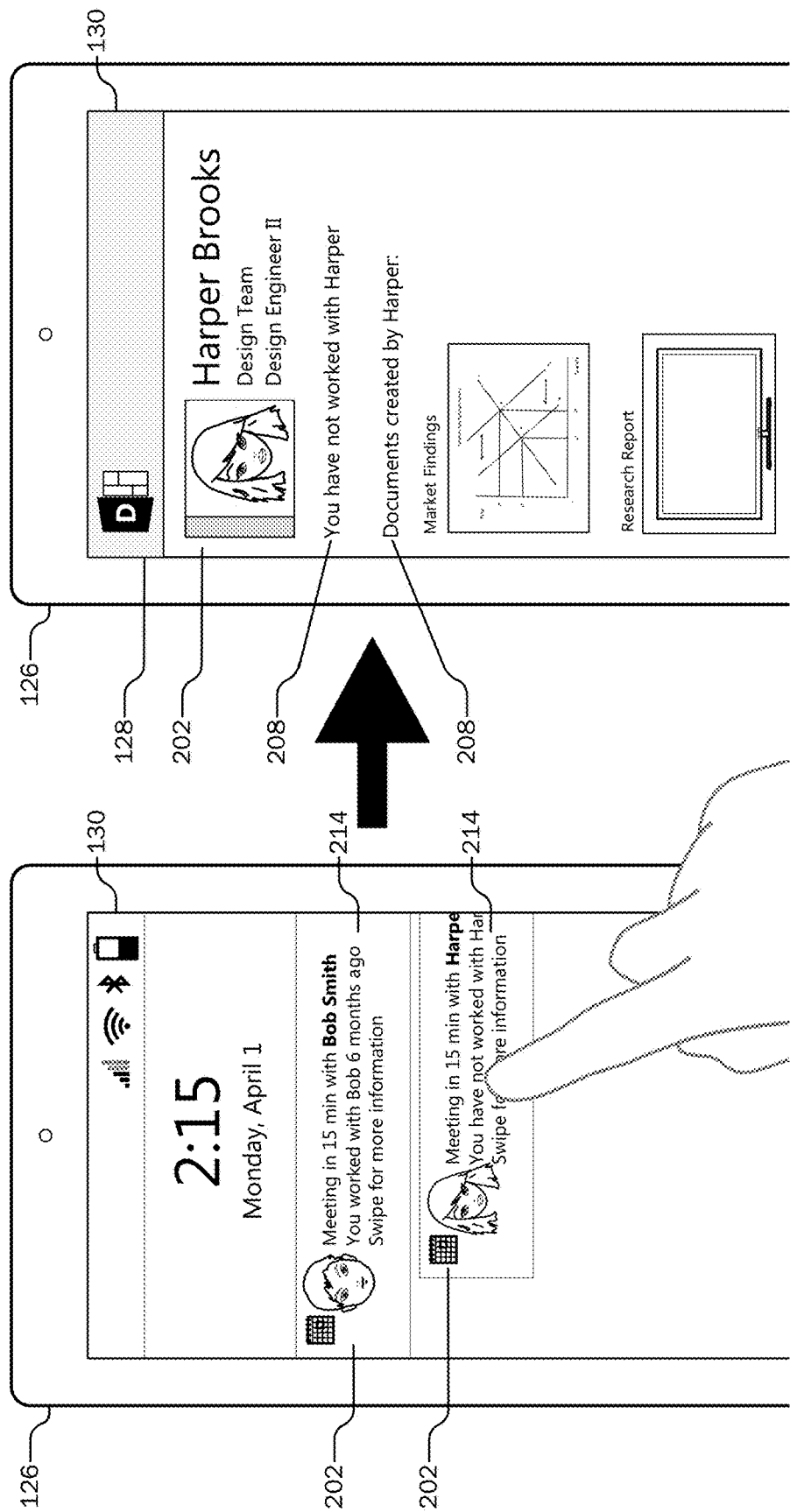

With reference now to FIG. 2C, in some examples, a discovery client application 128 provides a visual information element 202 for display to the user 124 in response to a triggering event. In some examples, the triggering event may be an amount of time before an event associated with an individual whom the user 124 has not met or worked with, whom the user 124 has worked with distantly, or whom the user 124 has not worked with recently. For example and as illustrated in FIG. 2C, at a predetermined time before a meeting with meeting attendees with whom the user 124 may not be familiar, the discovery client application 128 provides a visual information element 202 in the form of a notification 214. The notification 214 may include contextual information 208, such as information about whether or not the user 124 has worked with the meeting attendee in the past, and if so, the time since the user 124 and the individual shared an activity. As should be appreciated, other contextual information 208 may be provided. According to an aspect, the notification 214 may be selectable. Upon selection of the notification 214, the discovery client application 128 is operable to display additional information associated with the individual.

In some examples, the triggering event may be detection of a location. For example, the client application 128 may receive location information from a location-sensing component, such as a GPS system, a short-range wireless interconnection system (e.g., Bluetooth®), and the like on the client device 126. When the client application 128 receives an indication of proximity to a location associated with an event, such as a meeting location, the user's place of business, etc., the discovery client application 128 is operable to provide a visual information element 202, for example, in the form of a notification 214 as illustrated in FIG. 2C.

Figure 2D:
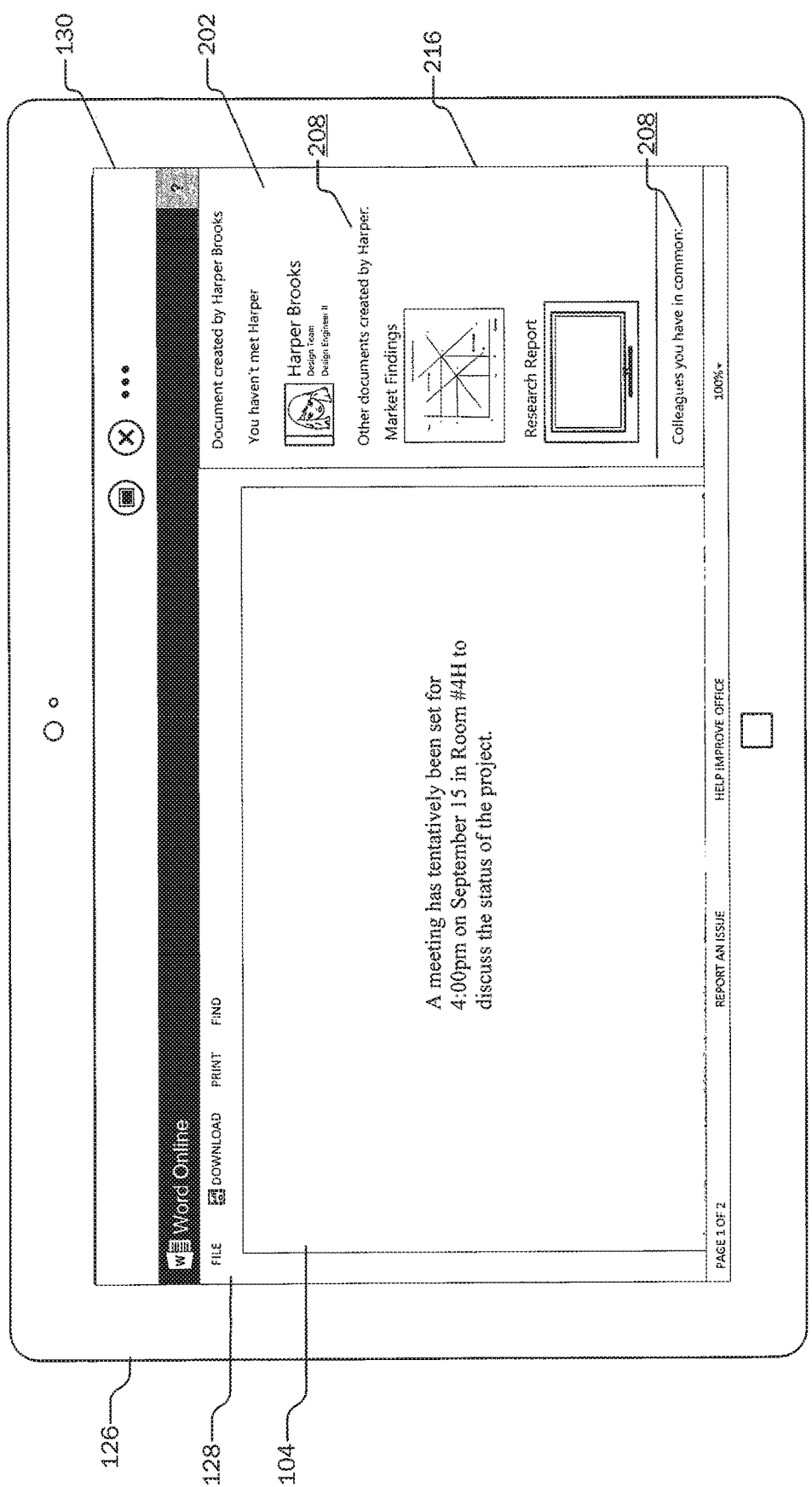
Figure 3:
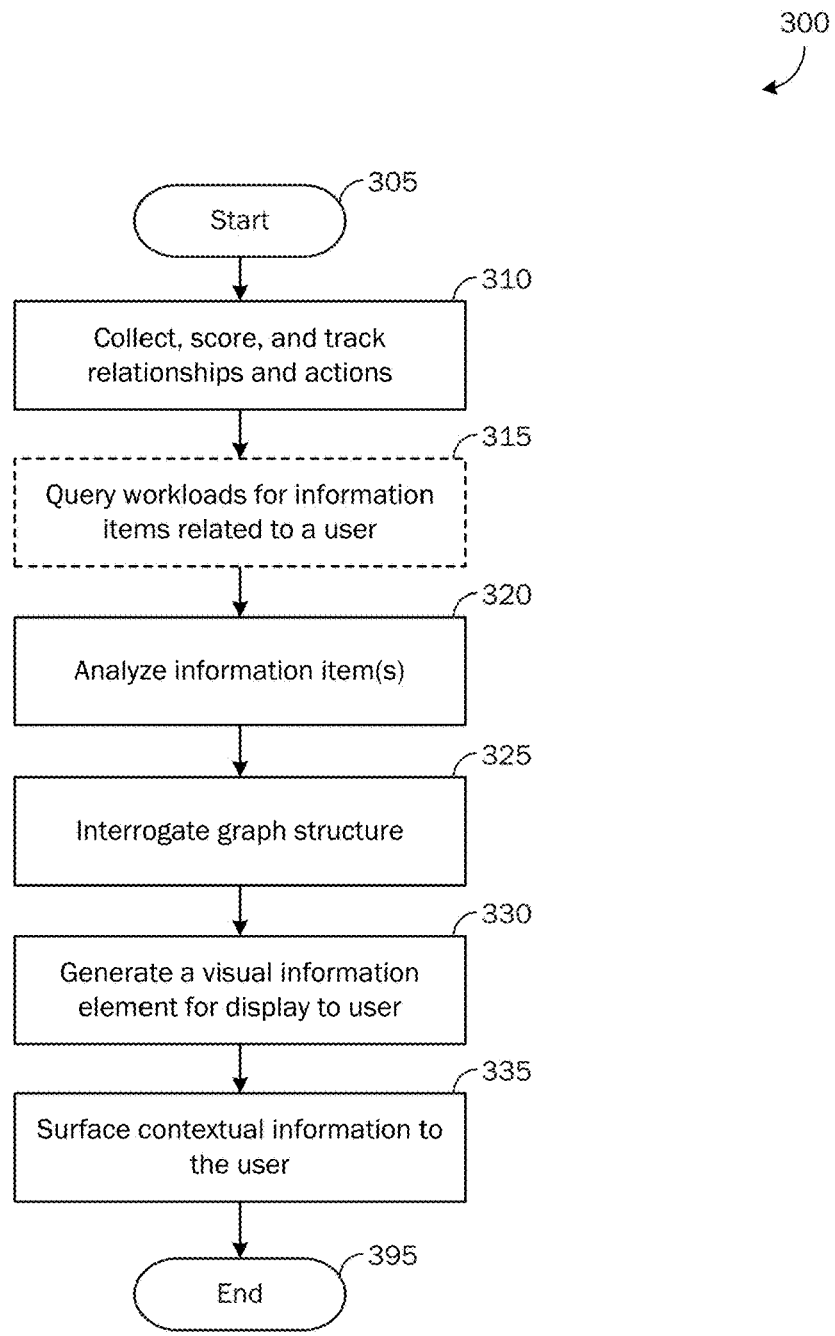
FIG. 3 is a flow chart showing general stages involved in an example method for identifying and contextualizing individuals in an organization.

With reference now to FIG. 2D, in some examples, a client application 128, such as a word processing application, a spreadsheet application, a slide presentation application, a notes application, etc., is operable to provide a visual information element 202 for display to the user 124. In some examples, the client application 128 provides a visual information element 202 for display to the user 124 in response to a detection of activity on an information item 104 produced by an individual whom the user 124 has not met or worked with, whom the user 124 has worked with distantly, or whom the user 124 has not worked with recently. According to an aspect, when a user 124 acts on an information item 104 (e.g., views the information item, shares the information item, modifies the information item, comments on the information item, etc.), a signal may be sent to the contextualizing engine 110 to determine whether there is a relationship between the user 124 and the producer of the information item 104 based on edges 112 in the graph structure 116. For example, the signal may include property information associated with the information item 104 for identifying the producer of the item. If a determination is made that the user 124 does not have a relationship with the producer of the information item 104, the output component 138 is operable to generate and provide a visual information element 202 to the client application 128 for display to the user 124 in the context of the information item 104. For example, the visual information element 202 may be displayed in a pane 216 in a user interface of the client application 128. The visual information element 202 may include information about the individual and contextual information 208 such as other information items 104 produced by the individual, colleagues who the individual and the user 124 have in common, etc.

Having described an operating environment and various aspects with respect to FIGS. 1-2D, FIG. 3 illustrates a flow chart showing general stages involved in an example method for identifying and contextualizing individuals in an organization. The method 300 begins at start OPERATION 305 and proceeds to ASYNCHRONOUS OPERATION 310, where the graph structure 116 tracks and stores organizational entities (e.g., information items 104, individuals, etc.) and the relationships between them as nodes 114 and edges 112 in the graph structure 116. For example, when an individual communicates with another individual via an electronic communication, nodes 114 are generated and stored for the individuals, and an edge 112 representative of the communication action is generated and stored in the graph structure 116 as a connection between the nodes 114.

The method 300 advances to OPTIONAL OPERATION 315, where the query component 132 of the contextualizing engine 110 queries one or more workloads 102 for discovery of information items 104 related to the user 124, the information items 104 having associated individuals about whom contextual information may be of relevance to the user 124. For example, the query component 132 queries a user's electronic calendar of a calendaring system 106 for discovery of upcoming meetings.

The method 300 proceeds to OPERATION 320, where the analysis component 134 analyzes an information item 104 for identifying individuals associated with the information item 104. For example, if the information item 104 is a meeting object, such as a meeting request for a meeting of which the user 124 is a potential attendee or a scheduled meeting on the user's calendar, the analysis component 134 analyzes properties of the meeting object for identifying one or more potential meeting attendees. As another example, if the information item 104 is an email that is sent to the user 124, analysis component 134 analyzes email properties for identifying the sender and/or other recipients of the email. As another example, if the information item 104 is a document that the user 124 is viewing, the analysis component 134 analyzes document properties for identifying the author or producer of the document. In some examples, OPERATION 320 further includes a filtering operation, where the analysis component 134 filters out certain information items 104, for example, meetings that include a large number of attendees or an email with a large distribution list, etc.

The method 300 proceeds to OPERATION 325, where the graph interface component 136 interrogates the graph structure 116 for determining whether each of the one or more individuals identified at OPERATION 320 is a person whom the user 124 has met or worked with in the past based on edges 112 and weights stored in the graph structure 116. As described above, the graph interface component 136 is operable to interrogate the graph structure 116 using a graph API.

According to an aspect, at OPERATION 325, the graph interface component 136 queries the graph structure 116 for individuals associated with the information item 104 who are not connected to the user 124 by an edge 112. The outcome includes a list comprising individuals who have no past relationship with the user 124 according to relationship data in the graph structure 116. For example, the user 124 and the individuals have not communicated via electronic communications, have not been attendees of a same meeting, do not share an organizational relationship (e.g., colleague, peer, manager, directs, etc.), and have not acted on information items 104 associated with the other person.

According to another aspect, at OPERATION 325, the graph interface component 136 queries the graph structure 116 for individuals associated with the information item 104 who are connected to the user 124 via an edge with a weight below a certain threshold. The outcome is a list comprising individuals who may have a distant working relationship with the user 124. For example, the user 124 and the individuals may have had a limited number of past communications, may have viewed an information item 104 associated with the other person, etc.

According to another aspect, at OPERATION 325, the graph interface component 136 queries the graph structure 116 for individuals associated with the information item 104 who are connected to the user 124 via older edges 112. The outcome is a list comprising individuals who have not recently interacted or worked with the user 124.

Upon identifying one or more individuals who are not connected to the user 124, who are distantly connected to the user 124, or who have not recently interacted with the user 124, the graph interface component 136 interrogates the graph structure 116 for discovering contextual information associated with each of the one or more individuals, for example, documents the individual has produced or authored, colleagues of the individual, and other contextual information, such as the person's job title, department, experience, background, etc.

The method 300 continues to OPERATION 330, where the output component 138 generates a visual information element 202 associated with each individual for display to the user 124. For example, the output component 138 generates a visual information element 202 that exposes the contextual information 208 associated with the individual discovered by the graph interface component 136 at OPERATION 325. In some examples, the output component 138 generates the visual information element 202 in response to receiving an indication of a triggering event, such as a predetermined amount of time before a meeting, a proximity to a location associated with a meeting or other activity, etc.

The method 300 continues to OPERATION 335, where the client application 128 surfaces the visual information element 202 to the user 124 on a display 130 of a computing device 126, and exposes contextual information 208 associated with one or more individuals to the user 124. As described above, the client application 128 may surface the visual information element 202 in a variety of formats, for example, in an electronic communication item, in a meeting request 212, in a meeting object 210, in a notification 214, in a pane 216, etc. As should be appreciated, the above examples are not meant to be limiting of the various formats via which the client application 128 may surface the visual information element 202 to the user 124. The method 300 ends at OPERATION 395.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
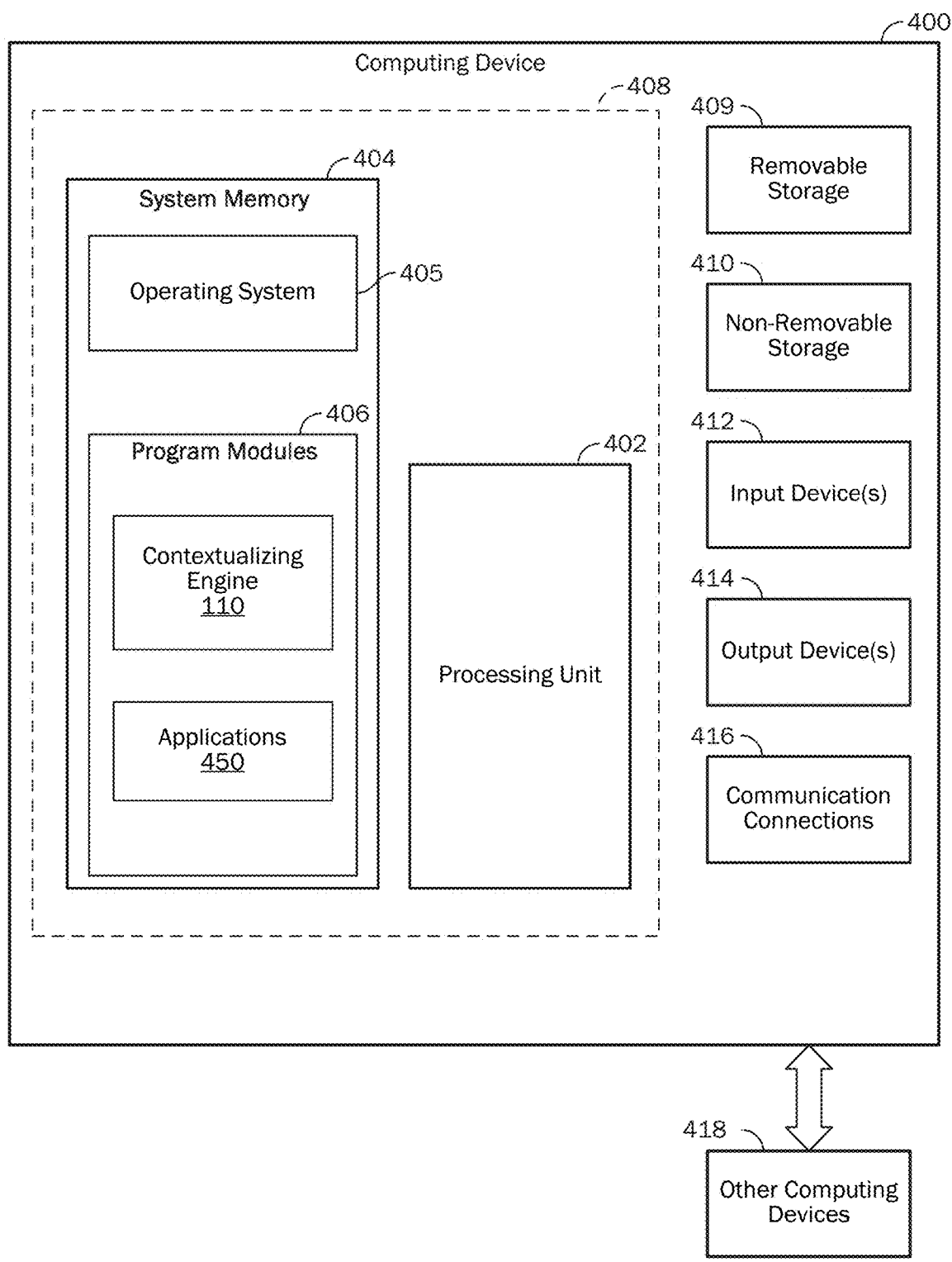
FIG. 4 is a block diagram illustrating example physical components of a computing device.
Figure 5A:
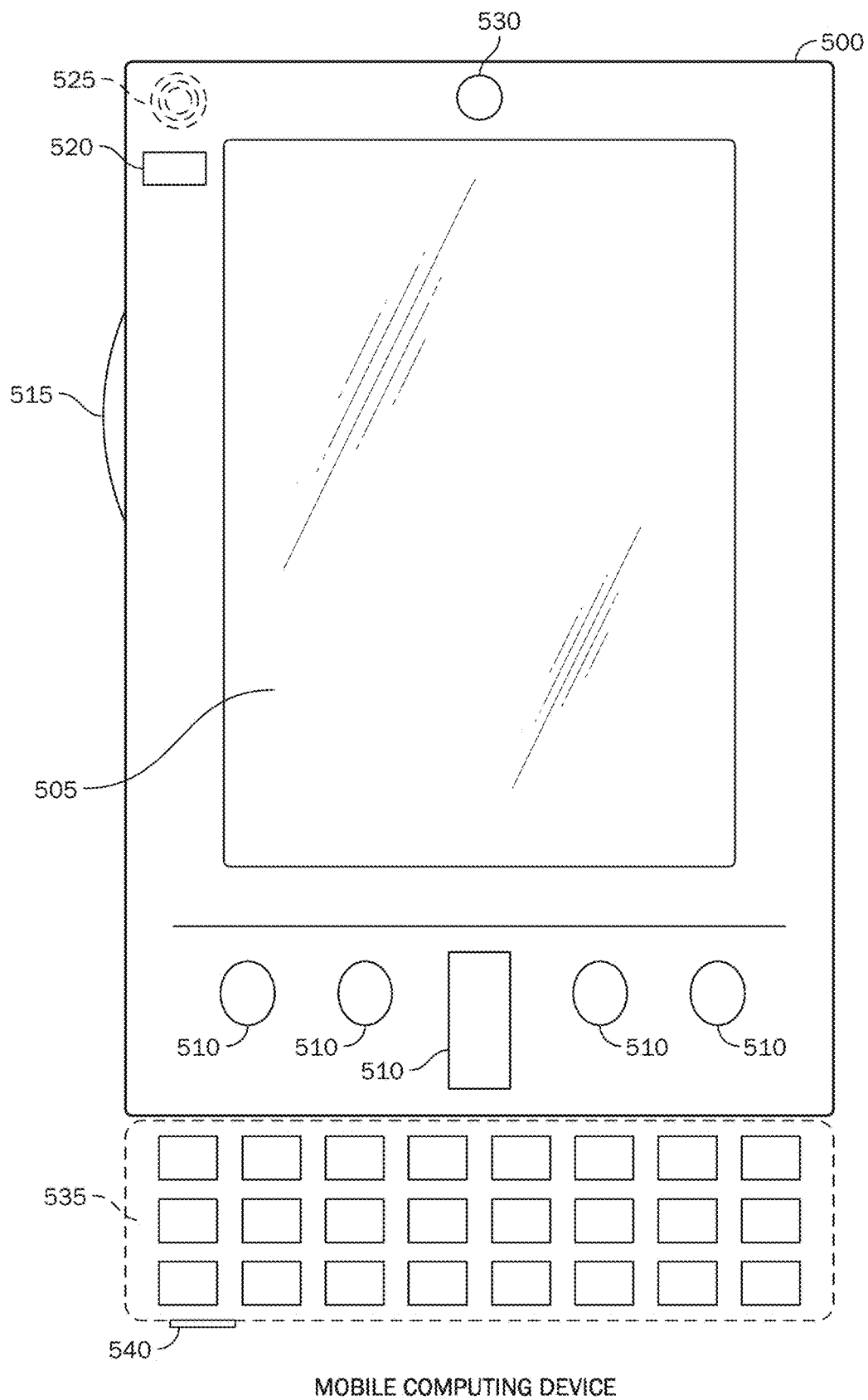
FIGS. 5A and 5B are simplified block diagrams of a mobile computing device.
Figure 5B:
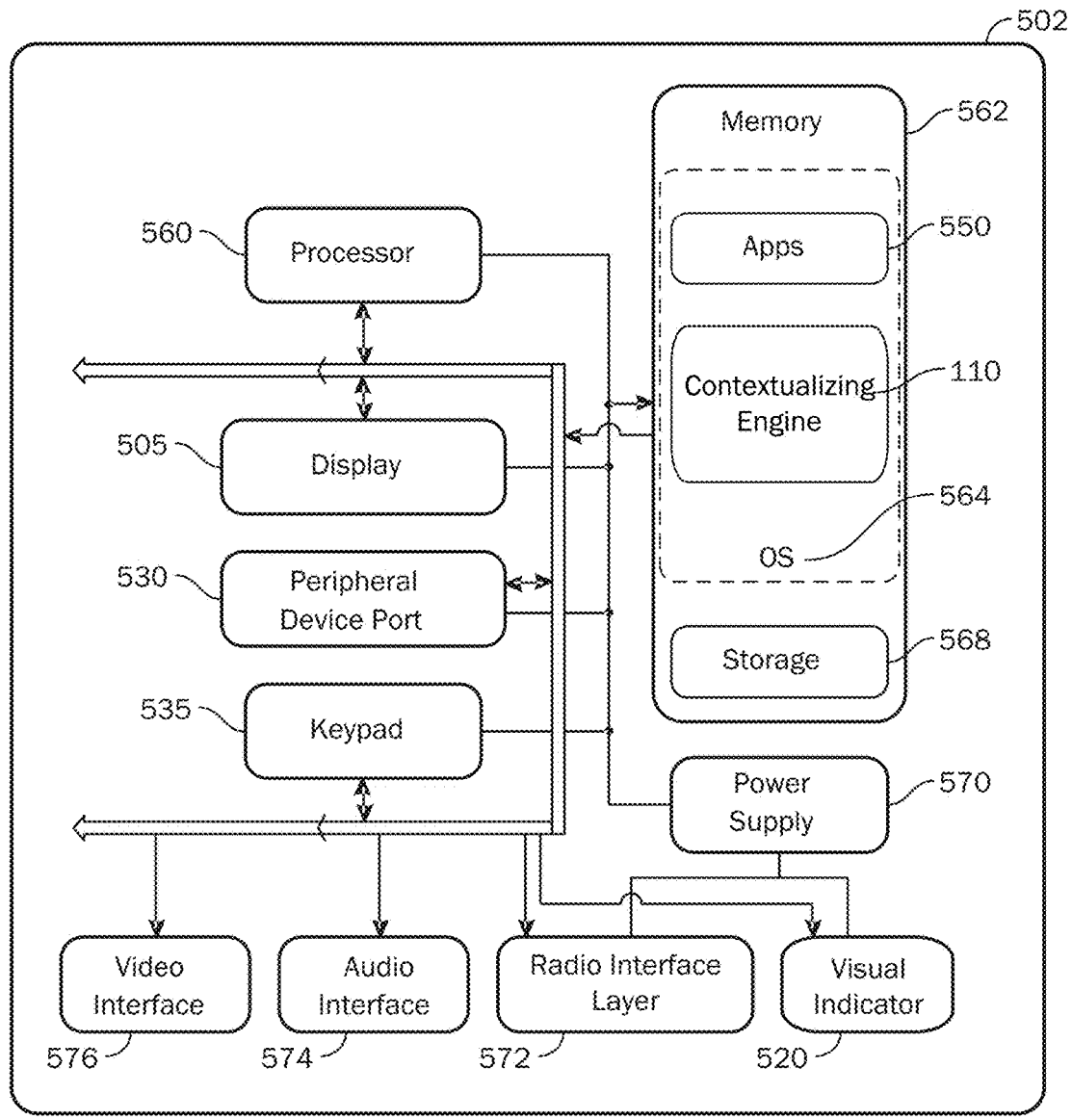
Figure 6:
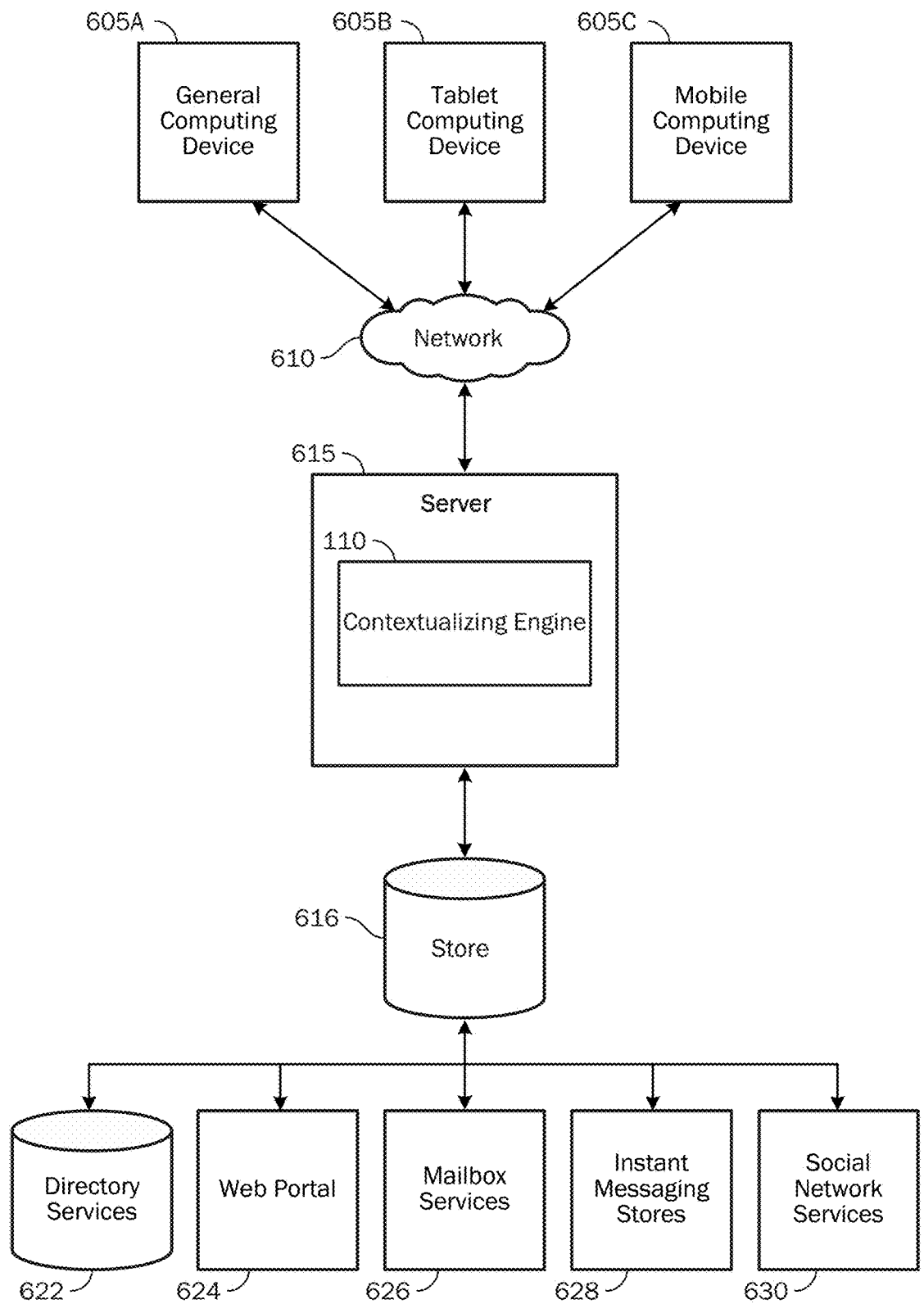
FIG. 6 is a simplified block diagram of a distributed computing system.

FIG. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure are be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the contextualizing engine 110. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., contextualizing engine 110) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, contextualizing engine 110 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for identifying and contextualizing individuals in an organization as described above. Content developed, interacted with, or edited in association with the contextualizing engine 110 is enabled to be stored in different communication channels or other storage types. For example, various documents may be stored using a directory service 622, a web portal 624, a mailbox service 626, an instant messaging store 628, or a social networking site 630. The contextualizing engine 110 is operable to use any of these types of systems or the like for identifying and contextualizing individuals in an organization, as described herein. According to an aspect, a server 615 provides the contextualizing engine 110 to clients 605A,B,C. As one example, the server 615 is a web server providing the contextualizing engine 110 over the web. The server 615 provides the contextualizing engine 110 over the web to clients 605 through a network 610. By way of example, the client computing device is implemented and embodied in a personal computer 605A, a tablet computing device 605B or a mobile computing device 605C (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for identifying and contextualizing an individual in an organization, comprising:
   identifying a plurality individuals associated with an information item relating to a user;
   querying an organizational graph for activity signals linking-the user to each of the plurality of individuals, wherein the activity signals each define an activity shared by the user and one of the plurality of individuals and further include-contextual information indicating at least one of a time of the activity and a location of the activity;
   based on the activity signals, determining that the user has a first type of relationship with a first individual and the user does not have the first type of relationship with a second individual;
   based on determining that the user does not have the first type of relationship with the second individual, querying the organizational graph for activity signals for discovering contextual information associated with the second individual; and
   generating a visual information element for display to the user based on the activity signals queried from the organizational graph, the visual information element comprising a textual description identifying an activity shared by the user and the second individual, the textual description defining at least one of a time of the activity and a location of the activity.

2. The method of claim 1, further comprising:
   presenting the visual information element within a content card that includes contact information for the second individual.

3. The method of claim 2, further comprising: searching an electronic calendaring system for one or more meeting objects, the one or more meeting objects associated with an upcoming meeting of which the user is an attendee.

4. The method of claim 3, wherein identifying the plurality of individuals associated with the information item relating to the user comprises identifying the plurality of individuals who are potential attendees of the upcoming meeting of which the user is an attendee.

5. The method of claim 1, wherein querying the organizational graph for activity signals associated with the user and each of the plurality of individuals comprises querying the organizational graph for an edge between the user and each of the plurality individuals, wherein the edge is a representation of at least one of an electronic communication between the user and the individual, a meeting attended by the user and the individual, an activity performed by the individual on an information item produced by the user, and an activity performed by the user on an information item produced by one of the plurality of individuals.

6. The method of claim 5, further comprising:
   determining that the user does not have the first type of relationship with the second individual based on a failure to discover an edge between the user and the individual.

7. The method of claim 1, wherein the method further comprises:
   querying the organizational graph for activity signals for discovering contextual information associated with the second individual, the contextual information including at least one of:
   information items produced by the second individual;
   colleagues of the second individual;
   meetings that the second individual is scheduled to attend; and
   profile information associated with the second individual, wherein the profile information includes information associated with the second individual's background or experience.

8. The method of claim 1, wherein the visual information element indicates a time and location that the user and the second individual last worked together.

9. The method of claim 1, wherein generating a visual information element for display to the user comprises generating a content card for display in a content feed.

10. The method of claim 1, wherein identifying the plurality individuals associated with an information item relating to a user comprises at least one of:
    identifying a sender of an electronic communication item to the user;
    identifying one or more recipients of an electronic communication item of which the user is also a recipient; and
    identifying one or more producers of a document acted on by the user.

11. The method of claim 1, further comprising:
    calculating a weight associated with an edge between the user and the first individual; and
    in response to determining that calculated edge weight is below a predetermined threshold, determining that the user has a distant working relationship with the first individual.

12. The method of claim 11, further comprising:
    based on determining that the user has a distant working relationship with the second individual,
    querying the organizational graph for activity signals providing contextual information associated with the second individual; and
    generating the visual information element for display to the user based on the contextual information, the visual information element comprising textual description that informs the user that the user has been identified as having a distant working relationship with the second individual.

13. The method of claim 1, further comprising:
    based on the activity signals, determining whether the user has had a recent relationship with an individual within a past six months;
    responsive to determining that the user has not had the recent relationship with the individual within the past six months, generating the visual information element.

14. The method of claim 13, wherein generating a visual information element for display to the user further comprises generating contextual information describing a non-recent relationship the user had with the second individual.

15. The method of claim 1, further comprising displaying the visual information element to the user, wherein displaying the visual information element comprises displaying the visual information element in at least one of:
    a content feed;
    an electronic communication item;
    a meeting request;
    a notification; and
    a document.

16. The method of claim 15, wherein prior to displaying the visual information element to the user, receiving an indication of a triggering event, the triggering event including at least passage of a predetermined time interval prior to an event associated with the information item relating to the user and a user coming within a predefined proximity of a location associated with the information item relating to the user.

17. A system for identifying and contextualizing an individual in an organization, comprising:
one or more processors for executing programmed instructions;
memory, coupled to the one or more processors, for storing program instruction steps for execution by the one or more processors;
a contextualizing engine comprising:
an analysis component operable to identify one or more individuals associated with an information item relating to a user;
a graph interface component operable to:
query an organizational graph for activity signals linking the user and each of the one or more individuals, wherein the activity signals each define an activity shared by the user and one of the individuals and further include contextual information indicating at least one of a time of the activity and a location of the activity;
based on the activity signals, determine whether the user has a first type of relationship with each of the one or more individuals; and
based on determining that the user does not have the first type of relationship with an individual of the one or more individuals, query the organizational graph for activity signals associated with the individual for discovering contextual information associated with the individual; and
an output component operable to generate a visual information element for display to the user based on the activity signals queried from the organizational graph, the visual information element comprising a textual description identifying an activity shared by the user and the individual, the textual description identifying at least one of a time of the activity and a location of the activity.

18. The system of claim 17, further comprising a query component operable to query a workload for one or more information items relating to the user prior to identifying one or more individuals associated with the information item relating to the user.

19. The system of claim 18, wherein:
in querying a workload for one or more information items relating to the user, the query component is operable to search an electronic calendaring system for one or more meeting objects, the one or more meeting objects associated with an upcoming meeting of which the user is an attendee; and
in identifying one or more individuals associated with the information item relating to the user, the analysis component is operable to identify one or more individuals who are potential attendees of the upcoming meeting of which the user is an attendee.

20. One or more nonvolatile computer readable storage media residing in memory, storing computer-usable instructions that, when used by one or more computing devices, cause the one or more computing devices to perform a method for identifying and contextualizing an individual in an organization, the method comprising:
querying an electronic calendar associated with a user for a meeting object associated with an upcoming meeting of which the user is an attendee;
identifying one or more potential meeting attendees of the upcoming meeting;
querying an organizational graph for activity signals associated with the user and each of the one or more potential meeting attendees, wherein the activity signals each define an activity shared by the user and a corresponding one of the potential meeting attendees and further include contextual information indicating at least one of a time of the activity and a location of the activity;
based on the activity signals, determining whether the user has a first type of relationship with each of the one or more potential meeting attendees; and
in response to determining that the user does not have the first type of relationship with a potential meeting attendee, querying the organizational graph for activity signals associated with the potential meeting attendee for discovering contextual information associated with the potential meeting attendee; and
generating a visual information element for display to the user based on the activity signals queried from the organizational graph, the visual information element comprising a textual description identifying an activity shared by the user and the potential meeting attendee, the textual description identifying at least one of a time of the activity and a location of the activity.

* * * * *